United States Patent Office 3,577,438
Patented May 4, 1971

---

3,577,438
METHOD OF PRODUCING OXETANE ESTERS
Bruce Allen Melaas, Corpus Christi, Tex., assignor to Celanese Corporation
No Drawing. Original application Oct. 31, 1963, Ser. No. 320,557, now Patent No. 3,328,427, dated June 27, 1967. Divided and this application Mar. 13, 1967, Ser. No. 635,936
Int. Cl. C07d 3/00
U.S. Cl. 260—333                 1 Claim

---

ABSTRACT OF THE DISCLOSURE

Disclosed herein are methods for producing bicyclic ortho esters and their isomers, oxetane esters. Bicyclic ortho esters are prepared by direct esterification of trimethylolalkanes with certain monocarboxylic acids. The bicyclic ortho ester can be converted to the oxetane isomer by heating at a temperature of from 275° C. to 525° C. in the presence of an alumina isomerization catalyst.

---

This is a divisional application Ser. No. 320,557, filed Oct. 31, 1963, which was issued as U.S. Patent 3,328,427 on June 27, 1967.

This invention relates broadly to the art of producing esters and, more particularly, to the production of "bicyclic ortho esters," and their isomers "oxetane esters." Bicyclic ortho esters, may be represented by the general formula:

I 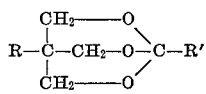

and the isomeric oxetane ester may be represented by the general formula:

IA 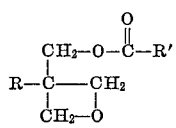

Both of these isomeric forms will sometimes hereinafter be referred to generically as bicyclic ortho esters. In the above formulas R represents a member of the group consisting of hydrogen and alkyl (including cycloalkyl), aralkyl, aryl and alkaryl radicals, and R' has the same meaning as R and, in addition, hydroxyalkyl (monohydroxyalkyl) and alkenyl. Preferably, R represents an ethyl radical. The method comprises heating, under certain specified conditions, a reaction mass containing essentially a dimethylol compound represented by the general formula:

II 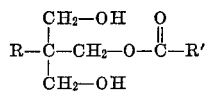

where R and R' have the same meanings as given above with reference to Formula I. The scope of the present invention also includes certain subclasses and species of ortho esters that can be produced by the method of the invention and which are believed to be new chemical compounds.

Illustrative examples of radicals represented by R in Formulas I, I-A and II and in other formulas herein are those containing from 1 to not more than about 18 carbon atoms, advantageously from 2 to 10 carbon atoms, inclusive. More specific examples of radicals embraced by R are methyl through octadecyl (both normal and isomeric forms), cyclopentyl, cyclohexyl, cycloheptyl, etc.; benzyl, phenylethyl, phenylpropyl, phenylisopropyl, and higher members of the homologous series of aralkyl radicals; phenyl, biphenylyl or xenyl, naphthyl and other aryl radicals containing not more than about 18 carbon atoms; and various alkaryl radicals including tolyl, xylyl, ethylphenyl, propylphenyl, isopropylphenyl and butylphenyl. Illustrative examples of radicals represented by R' in the aforementioned formulas are the same as those given above with reference to R and, in addition, the monohydroxyalkyl radicals wherein the alkyl grouping is methyl through octadecyl (both normal and isomeric forms); and alkenyl radicals, e.g., vinyl, α-methylvinyl, B-methylvinyl α,-ethylvinyl and the propenyl through octadecenyl (both normal and isomeric forms) radicals. Preferably R is an ethyl radical and R' is an alkyl or an alkenyl radical containing from 1 to 10 carbon atoms, inclusive.

The dimethylol compounds represented by Formula II, and which also may be described as monoesters of a polyol, can be prepared, for example, from a polyol, more particularly a trimethylolalkane, represented by the general formula III 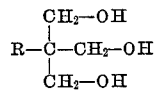

where R has the same meaning as given above with reference to Formula I.

The production of bicyclic ortho esters does not appear to have received much attention from prior investigators. H. W. Post, "The Chemistry of the Aliphatic Orthoesters," American Chemical Society Monograph Series Reinhold Publishing Corporation, New York, N.Y. (1943), gives a comprehensive review of the preparation, properties and reactions of aliphatic ortho esters up to the year of publication, but nowhere mentions the bicyclic ortho esters. The orthoformate ester of trimethylolethane (TME) was prepared by Doering and Levy (J. Am. Chem. Soc. 77, 509 (1955)). They obtained this orthoformate ester in a yield of only 7.7% by reacting ethyl orthoformate with trimethylolethane (TME) at 140° C. Barnes et al. (J. Org. Chem. 27, 90 (1962)) prepared the orthoacetate ester of TME by hydrogenation of the corresponding orthotrichloroacetate. Only a small over-all yield was obtained.

The present invention is based on my discovery that bicyclic ortho esters of the kind embraced by Formula I can be prepared in good (often very high) yields from trimethylolalkanes of the kind embraced by Formula III by, for example, direct esterification (Modification A) with a monocarboxylic acid represented by the general formula IV 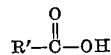

where R' has the same meaning as given above with reference to Formula I. The trimethylolalkane and the monocarboxylic acid are employed in a molar ratio of at least one mole of the former per mole of the latter. Preferably, an excess of trimethylolalkane is used, e.g., from 1 to 15 mole percent in excess of equimolar proportions. The reaction sequence when starting with a trimethylolalkane may be illustrated by the following simplified equations:

V 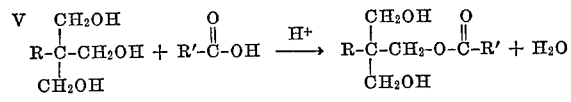

VI 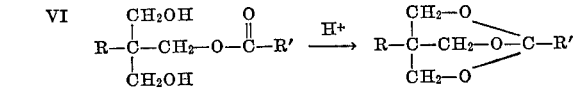

Certain of the bicyclic ortho esters of this invention also can be prepared (Modification B) by reacting together (1) a trimethylolalkane of the kind within the scope of Formula III and, for example, (2) a triester of a trimethylol alkane that is represented by the general formula

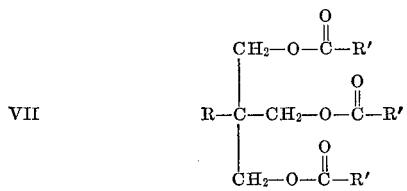

VII where R represents a member of the group consisting of hydrogen and alkyl, aralkyl, aryl and alkaryl radicals, and R' represents a member of the group consisting of alkyl, alkenyl, aralkyl, hydroxyalkyl, aryl and alkaryl radicals. In carrying out this reaction the reactants of (1) and (2) are employed in a molar ratio of at least ⅓ mole of the latter for each mole of the former; in other words, in at least the stoichiometric amount required to form the monoester of the trimethylolalkane of (1) by a transesterification reaction. Preferably the triester embraced by Formula VII is employed in excess of the stoichiometric amount required to form the aforementioned monoester, e.g., from 1 to 60 mole percent in excess of the aforesaid stoichiometric amount.

In a manner similar to that described above with particular reference to the use of a triester of a trimethylolalkane, there, of course, also can be employed a diester of a trimethylolalkane using two moles of such diester to only one of the unreacted polyol.

As a further alternative (modification C) to the procedures broadly described above, one can separately prepare a monoester (i.e., dimethylol compound) of the kind embraced by Formula II and then cyclicize this compound in accordance with this invention, and as illustrated by one of the examples which follow, to obtain the desired bicyclic ortho ester. Since this technique requires the separate isolation of the monoester before it is converted to the ortho ester, it is not as economical as the other procedures and wherein the monoester is formed in situ.

Regardless of the technique whereby the dimethylol compound (i.e., monoester of a trimethylolalkane) is prepared, that is, whether it is formed in situ or separately prepared, it is essential in practicing the present invention that the reaction under heat be effected (1) under acidic conditions, more particularly in the presence of an acidic catalyst, e.g., p-toluenesulfonic acid (PTSA); (2) under reduced pressure; (3) at a temperature sufficient to remove combined water from the dimethylol compound and whereby one molecule of water is evolved from each molecule of dimethylol reactant. Furthermore, the heating (4) should be correlated with the rate of formation of the bicyclic ortho ester product and (5) should be maintained at the lowest temperature consistent with the formation of the said ortho ester at an optimum rate. When the ortho ester is isolated by distillation, a condenser temperature should be used that will separate the ortho ester but will not separate the by-product water of reaction.

It was quite surprising and unobvious that a bicyclic ortho ester of the kind with which this invention is concerned could be prepared as briefly described above and more fully hereafter, especially in view of the known instability of polyols of the trimethylolalkane-type in the presence of either basic or acidic catalysts.

By practicing this invention and whereby yields of over 80% of the bicyclic ortho ester have been obtained, decomposition of the trimethylolalkane is not great. This unobvious result is believed to be due to the fact that under the specified reaction conditions the monoester of the trimethylolalkane is more stable than the trimethylolalkane itself. Taking trimethylolpropane (TMP) as illustrative of a trimethylolalkane, it may be mentioned that TMP reverts through the opposite of an aldol reaction at ∓40° C. and above. Surprisingly and unobviously TMP monoesters are not subject to a reverse aldol reaction at an appreciable rate when compared to the rate of the reaction whereby the ortho esters are formed.

In practicing the present invention, it is essential that the reaction be carried out under acidic conditions such as those imparted to the reaction mass by an acidic esterification (including transesterification) catalyst. A catalytic amount of such a catalyst is used, e.g., from, by weight, about 0.05% to about 3% based on the weight of the starting reactant or reactants. Illustrative examples of such catalysts that can be employed (either alone or admixed with each other in any proportions) are, in addition to p-toluenesulfonic acid mentioned hereinbefore, the following: sulfuric acid, phosphoric acid, benzenesulfonic acid or any other acid having a boiling point higher than that of the reaction mixture. Certain types of alumina also may be useful as the catalyst. Acidic ion-exchange resins that will withstand the above-indicated temperature requirements of the catalyst also may be utilized.

When the bicyclic ortho ester is formed by a two-stage sequence as illustrated by Equations V and VI or by a transesterification reaction as hereinbefore described, the acidic catalyst need not be removed by neutralization or otherwise from the reaction mass before continuing with the formation of the desired ortho ester. If desired or required, additional catalyst can be added while forming the regular ester including the monoester or while the bicyclic ortho ester is being formed.

The reaction can be carried out, at least initially, in the presence or absence of a solvent. Thus one may use, for example, a volatile (volatilizable), inert (substantially completely inert), liquid, reaction medium; and the reaction may be initiated, when using Modification A or B described above, while the reactants are contained in such a medium. By "inert" or "substantially completely inert" liquid medium is meant one which is so inert or non-reactive toward the reactants and the reaction product under the reaction conditions that it will not materially affect the course of the reaction or the constitution of the reaction product. By "liquid medium" is meant one which is liquid at the temperature and pressure employed in effecting the reaction. In other words the inert, liquid medium in which the reaction can be initiated may or may not be a liquid at room temperature or at any other temperature below the reaction temperature. Preferably a liquid medium that is volatile without decomposition is employed.

Illustrative examples of volatile, liquid, inert, reaction media that can be used are: aromatic hydrocarbons, e.g., benzene, toluene, xylene, etc.; the various inert ethers, e.g., di-n-propyl ether, the mixed normal and isomeric diamyl ethers, methyl butyl ether, tetrahydrofuran, m-dioxane, p-dioxane, pentamethylene oxide, etc.; the various ketones including the dialkyl ketones (e.g., the normal and various isomeric dibutyl and diamyl ketones, methyl butyl ketone, ethyl amyl ketone, etc.), methyl benzyl ketone, methyl phenyl ketone (acetophenone), etc. Other examples are the normal and branched-chain hydrocarbons which azeotrope water such as n-heptane, 2,2,4-trimethylpentane, and/or pentene, octane, etc.

The solvent or liquid reaction medium, as shown by the foregoing examples, may be one that boils below about 200° C. at atmospheric pressure. In some cases, however (e.g., in the preparation of an orthostearate), it may be desirable or necessary to use a higher-boiling solvent such as the phenyl ethers.

Another class of solvents in which the reaction may be effected comprises those capable of co-distilling with water but which cannot be returned to the reaction vessel due to their solubility in water. Examples of such solvents are dimethylformamide, dimethyl sulfoxide and similar materials. The solvent does not necessarily have to be a liquid at room temperature nor does it have to have a boiling point less than that of the ortho ester. For example, the triester of the polyol being converted may comprise the solvent during the ortho-ester-forming reaction. Such a solvent may provide certain advantages, e.g., a greater rate of reaction.

When using Modifications A or B there is first obtained a statistical distribution of the esters (mono, etc.). In general, the procedure thereafter is to first slowly strip off the liquid reaction medium (e.g., benzene), if employed. This liquid medium (solvent or diluent) advantageously, although not always necessarily, is removed under reduced pressure. Then the reaction mass is slowly distilled under reduced pressure without neutralizing or otherwise removing the acidic esterification catalyst. The base or pot temperature first increases, as distillation proceeds, to the boiling point of the regular monoester, for example, about 175° to about 185° C. in the case of TMP monopropionate, and at which temperature the corresponding bicyclic ortho ester begins to distill under reduced pressure and is continuously collected. As indicated hereinbefore, care should be exercised to keep the temperature of the base during distillation as low as is consistent with an appreciable bicyclic ortho ester-forming reaction rate.

Distillation is continued under reduced pressure until substantially all water obtained as a by-product of the reaction has been evolved.

The pressure may be reduced as distillation proceeds to the minimum required to isolate the desired bicyclic ortho ester. Because the ortho esters react with water, which is formed during the ring-closure reaction, one should use a partial condenser when this technique of isolating the product is employed. In other words, a condenser temperature that will separate the ortho ester but will not separate the water should be used. This temperature will depend, of course, upon the pressure under which distillation is being effected. For example, condenser water at a temperature of about 26°–27° C. proved very satisfactory when distilling off the ortho esters at pressures of about 2–10 mm. HgA.

The crude isolated product is then purified by one or more re-distillations, by conventional extraction or extractions with a selective solvent or solvents, by a combination of such means, or by other conventional technique used in purifying esters and other chemical compounds.

In order that those skilled in the art may better understand how the present invention can be carried into effect, the following examples are given by way of illustration and not by way of limitation. All parts and percentages are by weight unless otherwise stated.

EXAMPLE 1

This example illustrates the preparation of 1-methyl-4-ethyl-2,6,7-trioxabicyclo (2.2.2) octane (TMP orthoacetate), the formula for which is VIII 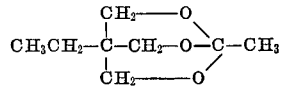

A 1 to 1 mole ratio of TMP (4.0 moles) and acetic acid (4.0 moles) was heated in a benzene solvent (500 cc.) using a p-toluenesulfonic acid (PTSA) catalyst (2.2 g.). The mixture was refluxed (at 85° to 100° C.) until the rate of water removal in a Dean-Stark trap became negligible. The resulting reaction mass, after stripping off the benzene solvent was cooled and dissolved in water (500 cc. to 1 liter). This aqueous solution was extracted three times with methylene chloride and the methylene chloride layer drawn off and dried. The use of the methylene chloride-water system enables separation of the bicyclic ortho ester from any unreacted TMP present and at least partial separation from the regular mono- and diacetate esters of TMP as well as catalyst. Distillation of the dried extract followed and the TMP orthoacetate was collected, B.P. 85° C. at 8 mm. HgA. A 36 mole percent yield of the crude ortho ester, $C_8H_{14}O_3$, was obtained. The pure ortho ester was a solid, M.P. 40°–41° C.

The product was sweet-smelling and sublimed readily at room temperature or slightly above. Elemental analysis: Calculated for $C_8H_{14}O_3$ (percent): C, 60.7; H, 8.9. Found (percent): C, 60.3; H, 9.2. Mass spectrometer analysis showed a large parent mass at 158. Infra-red absorption spectrum showed no hydroxyl or carbonyl absorption and showed characteristic cyclic C—O—C bond absorption in the skeletal region. On warming with aqueous ethanol ($H_2SO_4$ catalyst) ethyl acetate was formed.

In the foregoing procedure the reaction sequence follows that illustrated generically by Equations V and VI, and whereby an intermediate polyol monoester is first formed. This monoester is then dehydrated to yield the desired bicyclic ortho ester.

Examples 2, 3 and 4, which follow, illustrate the preparation of 1,4-diethyl-2,6,7-trioxabicyclo [2.2.2] octane (TMP orthopropionate) using different modifications of the general procedure described in Example I and whereby, in general, higher yields of the desired bicyclic ortho ester are obtained.

EXAMPLE 2

To a 2-liter round-bottomed flask was charged 535 g. TMP tripropionate (1.77 moles), with which was mixed 536 g. (4.0 moles) TMP and 3.0 g. PSTA (0.28 wt. percent based on reactants). The flask was surmounted with an 8-tray Oldershaw column, a variable takeoff-type head and condenser receiver fitted for vacuum distillation. Vacuum was applied (3.0 to 4.0 mm. HgA) and heating commenced. When the base temperature reached 187° C. the ortho ester began to distill and was continually collected from 90° to 104° C. During this time the base temperature increased to 233° C. The reflux ratio was varied from 9–1 down to 4–1. A total of 575 g. distillate was collected, which distillate was redistilled through an 8-tray Oldershaw column. A total of 491 g. of product comprising TMP orthopropionate was collected, B.P. 83° C. at 4.0 mm. HgA. The isolated yield of ester, $C_9H_{16}O_3$, based on propionate moiety charged, was 52.7 mole percent. On redistillation the product gave the following analysis. Calculated for $C_9H_{16}O_3$ (percent): C, 63.3; H, 9.4. Found (percent): C, 62.7; H, 9.6, $n_D^{20}$ 1.4519, Sp.gr.$_4^{20}$ 1.0696, F.P.=14°–15° C.

EXAMPLE 3

To a 2-liter round-bottomed flask were charged 536 g. TMP (4.0 moles), 296 g. propionic acid (93%, 3.73 moles), 500 ml. benzene and 2.2 g. PTSA (0.25 wt. percent based on reactants charged). The flask was fitted with a 1-ft. by 1-in. Vigreux column and a modified Dean-Stark water trap and condensers. The water takeoff rate became negligible after 4 hrs. at a reflux temperature of 97° to 100° C. The reaction mass was refluxed for one additional hour and left to stand for about 16 hrs. A total of 87 g. water containing 1.56 wt. percent propionic acid (1.36 g., 0.018 mole) was obtained.

The reaction product at this stage contained no TMP orthopropionate as determined by gas-chromatographic (GC) analysis. It was charged to a flask surmounted with an 8-tray Oldershaw column and a modified Claisen head. The PTSA catalyst was not neutralized or removed. The benzene was stripped off and the product phase collected, B.P. 68° to 126° C. at 2 to 3 mm. HgA. Care was exercised not to exceed 185° C. in the base. This was regulated by decreasing the heat input as the distillation was being carried out. A residue of 61 g. remained as a thick yellow-brown syrup. A total of 572 g. distillate was collected, which distillate was 92 wt. percent of product comprising TMP orthopropionate (532 g., 3.09 moles). The major component other than the desired product in the distillate was a regular TMP ester, probably TMP monopropionate. The efficiency to isolated ester $C_9H_{16}O_3$, was 83.4 mole percent (based on the amount of propionic acid converted).

In a similar experiment an 81 mole percent yield was obtained. The isolated product, however, was 99 wt. percent product. This improvement was accomplished through the use of a variable takeoff head. The maximum base temperature during the distillation of product was 188° C.

EXAMPLE 4

In a 2-liter round-bottomed flask were mixed 536 g. TMP (4.0 moles), 296 g. propionic acid (93 wt. percent, 3.73 moles) and 2.2 g. PTSA (0.25 wt. percent based on the reactants). The flask was placed beneath an 8-tray Oldershaw column, a swinging bucket variable takeoff head and a condenser receiver fitted for vacuum distillation. Heating was commenced and the water-propionic acid azeotrope taken overhead at a 40% takeoff rate. During this time the base temperature increased from 122° to 164° C. A total of 74 g. distillate containing 11.9 wt. percent propionic acid (8.8 g., 0.119 mole) was obtained.

At this stage vacuum was applied and, at 40% takeoff rate, product was collected up to 76° C. at 2.1 mm. HgA. The base temperature rose quickly from 92° to 177° C. (10 cc. distillate collected) and then more slowly to 181° C. (10 cc. distillate collected) and then more solwly to 181° C. Toward the end of the distillation the temperature was allowed to rise to 193° C. A total of 470 g. product was obtained. It contained 98 wt. percent $C_9H_{16}O_3$ ester (2.67 moles) as determined by GC analysis. A residue of 185 g. remained and 86 g. water was collected during product distillation which contained 3.8 wt. percent propionic acid (3.3 g., 0.04 mole). The isolated yield of $C_9H_{16}O_3$ ester was 75 mole percent based on the reacted propionic acid.

The TMP orthopropionates prepared as described under Examples 2, 3 and 4 were obtained in good yields. No methanol (or methyl propionate) and very little ethacrolein were obtained. Only about 10 to 15 g. of low-boiling organic material was obtained. Where a reaction solvent, e.g., benzene, was employed, more than 50% of this low-boiling material was reaction solvent. The residue from the distillation contained hydroxyl groups, ester functions and a small amount of acid catalyst. The major high-boiler in the residue comprises the diester of a TMP monoether. Diesters of monoethers of this general class may be represented by the general formula

IX

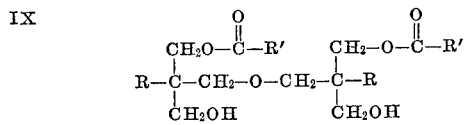

where R and R' have the same meaning as hereinbefore given with reference to Formula I and other formulas in this case. The residue also undoubtedly contains some unetherified TMP esters.

The ether-esters embraced by Formula IX, including the symmetrical and unsymmetrical diesters of a monoether of a trimethylol alkane, e.g., such diesters of the monoethers of trimethylolethane and trimethylolpropane, are useful as chemical intermediates in all such applications where compounds containing a functional group or groups, e.g., a hydroxy group, are useful. For instance, they can be used as a reactant in making synthetic resins by reaction with an aldehyde such as formaldehyde, acetaldehyde, acrolein, furfural, glyoxal and other aldehydric materials. They also may be used as modifiers of synthetic resins or their partial condensation products, e.g., phenol-aldehyde, urea-aldehyde, melamine-aldehyde (including phenol-urea- and melamine-formaldehyde) partial condensation products or resins.

EXAMPLE 5

A monopropionate ester of TMP was prepared by reacting together equimolar proportions of propionic acid and TMP using an ion-exchange resin of the acidic type as an esterification catalyst, which resin was then removed by filtration. The crude product was heated to reflux under reduced pressure. The temperature of the vapors was that of the normal ester mixture (133° C. at 1.5 mm. HgA). The monoester was then distilled and collected from 133° to 146° C. at 1.4 mm. HgA. The distillate was, in turn, distilled under ortho ester-forming conditions, for instance, in essentially the same manner as described under Example 4. After 10 cc. of monoester had been collected, PTSA catalyst (0.8 wt. percent) was added, whereupon the overhead temperature fell rapidly to 87°–88° C. at 2.6 mm. HgA. TMP orthopropionate was then collected (based on GC analysis). The atmospheric boiling point of TMP orthopropionate was found to be 220° to 221° C.

EXAMPLE 5

To a 2-liter round-bottom flask, fitted with a 1 foot by 1 inch Vigreux column and a modified Dean-Stark water trap with suitable Allihn bulb condensers, were charged 536 grams TMP (4.0 moles), 209 grams 88% formic acid (4.0 moles), 500 cc. benzene solvent and 3.0 grams p-toluenesulfonic acid. After standing overnight the homogeneous mixture was refluxed and the water, 101 grams collected. This water contained 6.6 wt. percent formic acid by titration with standard caustic.

The solvent was then removed and the product comprising ortho ester collected, B.P. 142° to 150° C. at 4.0 to 8.5 mm. HgA. A total of 310 grams of a thick syrup, which was a mixture of TMP orthoformate and the regular TMP esters was obtained. This crude product was sublimed and the white crystalline TMP orthoformate, 125 grams, obtained. (Analysis: Calc'd for $C_7H_{12}O_3$ (percent: C, 58.3; H, 8.3. Found (percent): C, 58.4; H, 8.5). Yield of pure $C_7H_{12}O_3$ ester was 22.2 wt. percent on formic acid reacted; M.P.=60° C.

EXAMPLE 7

To a 2-liter round-bottom flask, fitted as in Example 3, were placed 480 g. technical grade trimethylolethane, 318 g. 93 wt. percent propionic acid (4.0 moles), 2.0 g. p-toluenesulfonic acid and 473 cc. benzene. The esterification reaction was conducted in the normal manner. After water evolution was essentially complete, the benzene solvent was removed under reduced pressure and the distillation continued. A total of 507 g. of product comprising TME orthopropionate was collected, B.P. 75° C. at 3.0 mm. HgA. The residue remaining weighed 114 g. The yield of $C_8H_{14}O_3$ ester obtained was 80.2 mole percent based on reactants charged.

This material was redistilled and pure product obtained, B.P. 60.5° C. at 3.0 mm. HgA. It had a F.P. of 14.5° to 15.5° C. Anal. calculated for $C_8H_{14}O_3$ (percent): C, 60.7; H, 8.9. Found (percent): C, 60.7; H, 9.1. $n_D^{20}$ 1.4473, Sp.gr.$_4^{20}$ 1.0837.

EXAMPLE 8

To a 2-liter round-bottom flask were charged 520 g. n-heptanoic acid (4.0 moles), 536 g. TMP (4.0 moles), 3.0 g. p-toluenesulfonic acid and 600 cc. benzene. No more water from the regular ester formation was observed after 3¼ hours. A total of 66 ml. water containing 0.2 wt. percent heptanoic acid was collected. A GC analysis of the reactor product after the benzene solvent was removed showed the presence of a small quantity of ortho heptanoate.

The crude ester mixture was then distilled under reduced pressure (3.2 mm. HgA) and the $C_{13}H_{24}O_3$ ester collected from 140° to 146° C. A total of 215 g. (23.5% yield) was obtained that crystallized on standing. This material was recrystallized from n-pentane, yielding white needles; M.P. 29–30° C.

*Analysis.*—Calculated for $C_{13}H_{24}O_3$ (percent): C, 68.4; H, 10.6. Found (percent): C, 68.5; H, 10.8.

EXAMPLE 9

As per previous examples there were charged to a 2-liter flask 536 g. TMP (4.0 moles), 408 g. pivalic acid (4.0 moles), 500 cc. benzene and 3.0 g. p-toluenesulfonic acid and a TMP monopivalate mixture prepare in the classical manner.

After stripping off the solvent the product was heated below a 2-tray Oldershaw column fitted with a Claisen-type head. The product containing TMP orthopivalate was collected, B.P., up to 133° C. at 2 mm. HgA. A total of 622 g. of white solid (3.1 moles based on mol. wt. 214) was collected. This amounts to a yield of 77.5 mole percent of $C_{11}H_{20}O_3$ ester based on acid and polyol originally charged. Water and decomposition products amounted to only 97.5 g. and the residue remaining after distillation was 114.5 g.

The crude $C_{11}H_{20}O_3$ ester was extracted with diethyl ether and the ether removed. The resulting white solid was recrystallized from n-pentane. Needles were obtained. M.P. 94–94.5° C.

*Analysis.*—Calculated for $C_{11}H_{20}O_3$ (percent): C, 66.0; H, 10.1. Found (percent): C, 65.8; H, 10.4.

EXAMPLE 10

Four moles each of trimethylolbutane (TMB) and propionic acid along with 473 ml. benzene and 3.0 g. p-toluenesulfonic acid were charged to a 2-liter flask. The monoester was formed in the usual manner. After stripping off the solvent a total of 605 g. of colorless product comprising TMB orthopropionate was collected, B.P. 92° C. at 3.0 mm. HgA. This corresponds to an 81.4 mole percent yield of crude $C_{10}H_{18}O_3$ ester based on the reactants charged.

This material was redistilled through a 1 m. Vigreux column, B.P. 103° C. at 5.0 mm. HgA, F.P. 24°–25° C.

*Analysis.*—Calculated for $C_{10}H_{18}O_3$ (percent): C, 64.5; H, 9.7. Found (percent): C, 64.6; H, 9.8. $n_D^{20}$ 1.4517. Sp.gr.$_4^{20}$ 1.0419.

EXAMPLE 11

Charged to a 2-liter flask were 536 g. TMP (4.0 moles), 378 g. chloroacetic acid (4.0 moles), 500 cc. benzene and 3.0 g. p-toluenesulfonic acid. After forming the monoester and stripping the solvent in the accepted manner the mixture was distilled under reduced pressure. There was collected 538 g. of product (B.P. 153° C. at 3.0 mm. HgA.) which, based on GC analysis, contained 75 mole percent of product comprising orthochloroacetate. This represents a 52.5 wt. percent yield based on the reactants charged. A 256 g. residue remained.

This product was extracted with warm n-pentane, the extract cooled and the pure $C_{18}H_{13}O_3Cl$ ester filtered and dried under vacuum, yielding white needles; M.P. 53–54° C.

*Analysis.*—Calculated for $C_8H_{13}O_3$ (percent): C, 49.9; H, 6.8; Cl, 18.4. Found (percent) C, 50.1; H, 7.1; Cl, 18.1.

EXAMPLE 12

To a 1-liter round-bottom flask were charged 186 g. caproic acid (1.6 moles), 145 g. TMP (1.1 moles), 4.0 g. conc. $H_2SO_4$ and 473 cc. benzene. The crude product comprising TMP monocaproate mixture was prepared in the classical fashion after which the solvent was removed under reduced pressure. Distillation was continued and the orthocaproate product was collected from 112° to 134° C. at 3.0 mm. HgA. The crude product amounted to 159 g. (46.2% yield), the residue weighing 87 g.

This crude $C_{12}H_{22}O_3$ ester was recrystallized, M.P. 41.5–42° C.

*Analysis*—Calculated for $C_{12}H_{22}C_3$ (percent): C, 67.3; H, 10.4. Found (percent): C, 66.8; H, 10.4.

Instead of the particular monocarboxylic acids employed in certain of the foregoing illustrative examples, one can use any other monocarboxylic acid of the kind embraced by Formula IV including benzoic, phenylacetic (alpha-toluic), ortho-, meta-, and para-toluic (or mixtures thereof), cyclohexanoic, decanoic, octadecanoic, acrylic, alpha-methacrylic, crotonic, pentenoic, octenoic, octadecanoic, glycollic and others that will be readily apparent to those skilled in the art from the foregoing illustrative examples of radicals represented by R' in Formula IV. Also, instead of using TMP tripropionate as a reactant with TMP as in Example 2, one can use any other triester of a trimethylolalkane that is represented by Formula VII, specific examples of which are those wherein R' in said formula are radicals derived from the above-named monocarboxylic acids. Additionally, instead of the particular trimethylolalkanes employed in the foregoing examples, one can use any other trimethylolalkane of the kind embraced by Formula III. Specific examples of such trimethylolalkanes will be obvious from the illustrative examples of radicals represented by R that were given in the beginning of the specification.

Instead of benzene, any other inert, volatile, liquid, reaction medium of which numerous illustrative examples were given hereinbefore, or other solvent, can be used.

The bicyclic ortho esters represented by Formula I are convertible to the corresponding oxetane esters represented by Formula I-A. The production of bicyclic ortho ester as hereinbefore described results in the simultaneous production of some oxetane ester. When, for example, propionic acid is used in the practice of this invention, the proportion of oxetane ester produced is, for instance, approximately 17 weight (or mole) percent of the total ester (bicyclic and oxetane) product. Thus, when the yield of total ester is indicated as being, for example, 80 mole percent this might more accurately be stated as 66.4 mole percent of bicyclic ortho ester and 13.6 mole percent of oxetane ester.

It has been found that the isolated bicyclic ortho ester can be rearranged, by heating, to the oxetane ester. For example, starting with relatively pure orthopropionate and using a catalyst of alumina (e.g., alundum), a 64 mole percent yield of TMP oxetane propionate was obtained. It has further been discovered that the bicyclic ortho esters can be prepared by way of a very facile acid-catalyzed rearrangement of the corresponding oxetane ester.

The several reactions described above may be illustrated by the following equations:

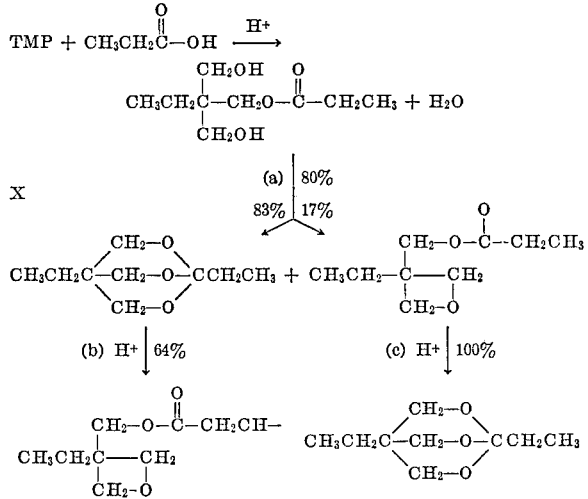

In carrying out the general reaction illustrated by Equation X(b) the bicyclic ortho ester is merely heated preferably in the presence of an isomerization or rearrangement catalyst, at a temperature above about 275° C., usually above about 300° C., e.g., within the temperature range of from about 325° C. to about 525° C.

EXAMPLE 13

Five (5) parts of TMP orthopropionate was heated at a temperature above 300° C. but below 500° C. in the presence of a small amount, more particularly about 0.4 part, of an alumina catalyst until there was obtained about 3.2 parts of the corresponding oxetane ester, which represents a 64% yield of TMP oxetane propionate.

In carrying out the general reaction illustrated by Equation X(c) the oxetane ester is merely warmed slightly above ambient temperature or heated at a materially higher temperature in the presence of a suitable rearrangement catalyst, e.g., a Bronsted or Lewis acid (acidic material) until substantially complete rearrangement to the ortho ester has been effected. Illustrative examples of the aforementioned catalysts that may be used are $H_2SO_4$, $BF_3$, $FCl_3$,

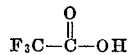

$AlCl_3$, $SnCl_4$, $ZnCl_2$, $TiCl_4$ or others known in the art. The temperature at which the oxetane ester is heated may range, for example, between about 40° C. and about 100° C.

EXAMPLE 14

Three (3) parts of the oxetane ester produced as described in Example 13 was heated at 60° C. in the presence of a small amount, more particularly about 0.03 part, of sulfuric acid as catalyst until complete rearrangement to the ortho ester was effected. Thus, the yield of TMP ortho propionate was 100%.

The oxetane ester of Example 13 as well as other oxetane esters embraced by Formula I-A may be homopolymerized or used as a comonomer in making binary, ternary, quaternary or higher multi-component copolymers. If desired, the homopolymer or copolymer may be subsequently or concurrently hydrolyzed under acid or alkaline conditions to yield a polymer containing pendant functionally reactive hydroxyl groups. Taking TMP oxetane propionate as illustrative of the oxetane ester, the reaction may be illustrated by the following equations:

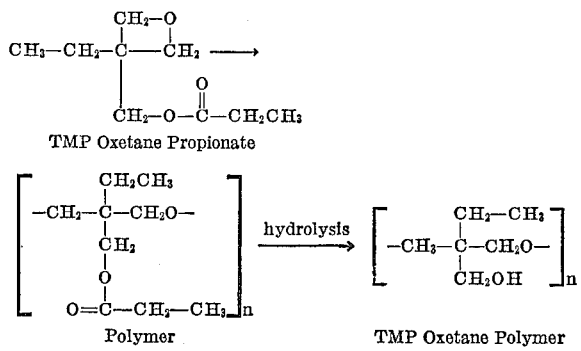

The different oxetane esters embraced by Formula I-A may be copolymerized with each other or one or more of them may be copolymerized with a large variety of other polymerizable monomers and other materials that are copolymerizable therewith including cyclic ethers, e.g., epoxides, etc., lactones, e.g., beta-propiolactone, etc.; or they may be modified by reaction with other reactive materials, e.g., mono- and polyisocyanates, etc.

The polyol esters of this invention, both the bicyclic ortho and the polyol oxetane esters, have unusual combinations of characteristics that render them especially valuable as chemical intermediates and in other applications. For instance, a polyol unsaturated ester, e.g., acrylate, of the kind embraced by Formula I or I-A can be polymerized through the unsaturated ester portion of the molecule. Such polymerization may be effected, for example, under anhydrous conditions and following the techniques commonly employed or suggested for polymerizing polymerizable unsaturated compounds, e.g., under heat, with or without the aid of a free-radical (e.g., peroxy, azo, etc.) catalyst, an ionic catalyst and/or other catalytic influences, e.g., ultraviolet light or ionizing radiations, or by any other single or plurality of means. The polymer can then be hydrolyzed, e.g., under acidic conditions using, for instance, an aqueous solution of sulfuric acid, to rupture the ring and to obtain a linear polymer having a backbone with —$CH_2OH$ groups attached to the different units of the linear chain. Such polymers (or copolymers of the polyol unsaturated ester which similarly can be produced) can then be reacted with isocyanates, epoxides, aminoplasts (e.g., urea-formaldehyde, melamine-formaldehyde, phenol-formaldehyde partial condensation products) and other compounds that are reactive with methylol compounds to form a new class of polymeric materials that are useful in coating, laminating, adhesive, molding, casting, impregnating, sealing and other applications.

EXAMPLE 15

This example illustrates another use as a chemical intermediate of ortho esters embraced by Formula I.

TMP monopropionate was formed by adding TMP orthopropionate to an excess over the theoretical amount of water required for the desired hydrolysis, which water contained a small amount of an acidic substance, specifically acetic acid as a catalyst. GC analysis showed complete hydrolysis and a peak for only the monoester. The ortho ester thus provides a convenient and economical way to obtain a polyol monoester that is free from contamination with di- and triesters.

Instead of acetic acid any other organic or inorganic acid or acidic material, especially those which are commonly used in hydrolysis reactions, may be employed. Among such acids may be mentioned sulfuric, hydrochloric, dichloro- and trichloroacetic acids, difluoro- and trifluoroacetic acids and homologues of acetic acid, both substituted and unsubstituted.

The esters of this invention may also be used (in addition to those mentioned hereinbefore) as solvents, sequestering agents, modifiers of natural and synthetic resins, and for other purposes.

It will be understood, of course, by those skilled in the art that the present invention is not limited to the use of the specific ingredients, proportions thereof, temperature, time and other conditions of reaction that are given in the foregoing detailed description and examples by way of illustration.

The embodiments of the invention in which an exclusive property or privilege is claimed are as follows:

1. The method of producing an oxetane ester represented by the general formula

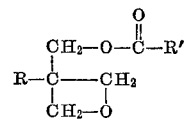

where R represents an alkyl radical having 1 to 10 carbon atoms and R' represents a number of the group consisting of hydrogen and alkyl radicals having 1 to 10 carbon atoms, said method comprising isomerizing the corresponding ortho ester by heating at a temperature above 275° C. but not higher than about 525° C. in the presence of an alumina isomerization catalyst.

References Cited

UNITED STATES PATENTS

| | | | |
|---|---|---|---|
| 2,910,483 | 10/1959 | Schnell et al. | 260—333 |
| 3,000,901 | 9/1961 | Wyler | 260—333 |
| 3,105,838 | 10/1963 | Luskin | 260—333 |
| 3,278,554 | 10/1966 | Stark | 260—333 |
| 3,112,280 | 11/1963 | Farthing | 260—333 |
| 3,301,923 | 1/1967 | Skovronek | 260—333 |

NORMA S. MILESTONE, Primary Examiner